March 22, 1960
G. A. TINNERMAN
2,929,121
CLAMPS
Filed June 4, 1958
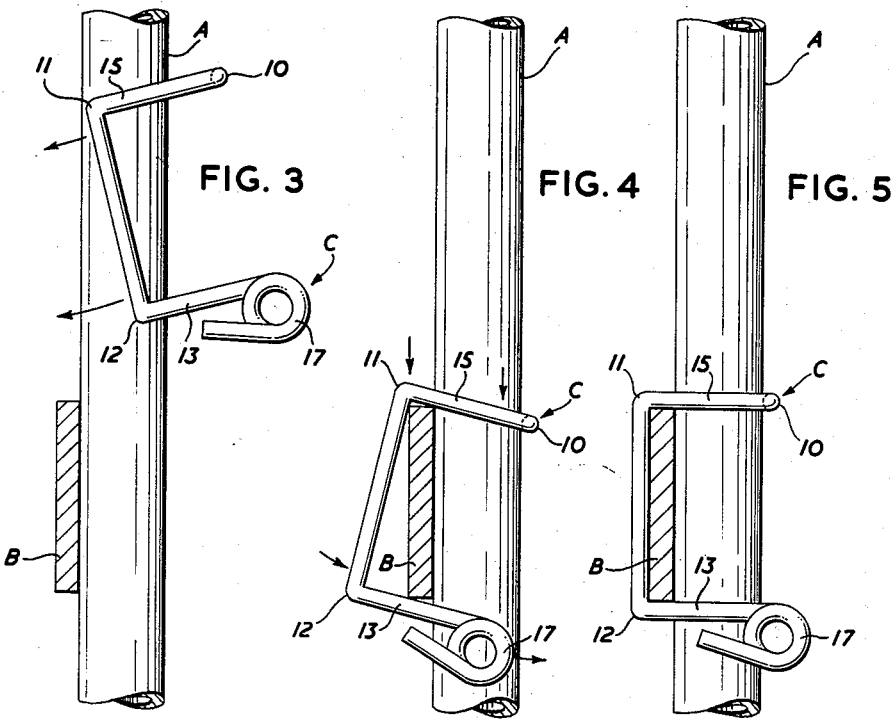
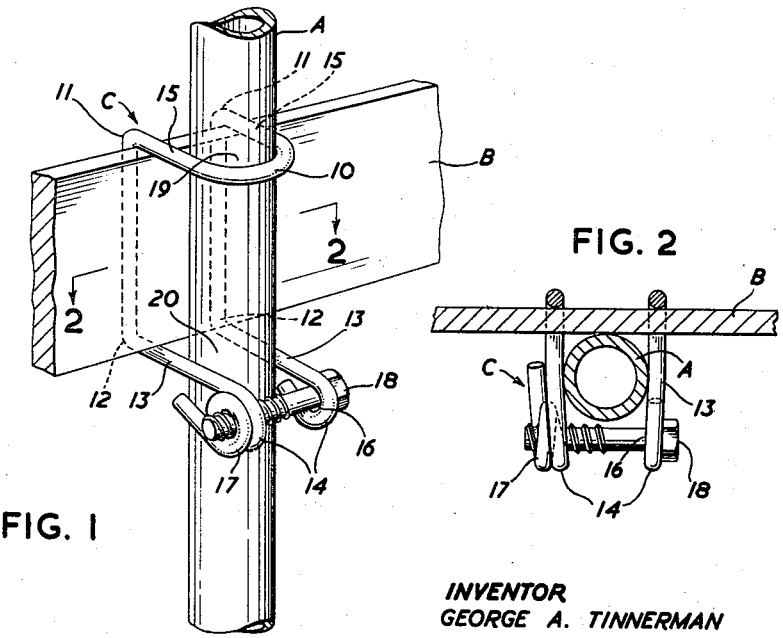
INVENTOR
GEORGE A. TINNERMAN
BY: Featherstonhaugh & Co
ATTORNEYS

2,929,121
CLAMPS

George A. Tinnerman, Lakewood, Ohio

Application June 4, 1958, Serial No. 739,756

1 Claim. (Cl. 24—81)

This invention relates to a clamp for securing rod, tube and like elements to a mounting member.

The invention is adaptable to the securement of electrical and telephone conduit in buildings and the like and will be illustrated in respect thereto, although not confined to this specific manner of use.

In the mounting of conduit in buildings some of this conduit is disposed in the elevator shafts and extends from the ground level to the top of the building. It is necessary, of course, to secure this conduit at frequent intervals throughout its extent. It has been the practice to employ channel iron and the like extending transversely to the shaft at intervals throughout its extent and to secure the conduit thereto by complicated fittings which are not only costly but require a substantial amount of time to install. The present invention avoids the disadvantages of this prior manner of installation and provides a simple, economical clamp which may be installed quickly and is usable in conjunction with a simple mounting member in the form of a bar or the like whereby to provide a most practical and firm means of securement.

The invention generally embodies a clamp in the form of a body formed by a pair of spaced, substantially parallel, U-shaped members, each having a first arm and a second arm, said second arms terminating in free ends in substantially parallel relation to one another, the first arm of each of said members being integrally joined, the free ends of the second arm of each of said members being connectable under tension, said body thereby forming a pair of channels at right angles to one another, one for receiving said element and the other for receiving said mounting member and securing them to one another when said free ends of said second arms are secured together under tension. Preferably the body is formed from one continuous piece of somewhat resilient wire bent upon itself to the desired configuration in which the terminal ends of the second arms are looped and adapted to receive tension applying means.

The invention will be more clearly understood by reference to the following detailed specification taken in conjunction with the accompanying drawings.

In the drawings Figure 1 is a perspective view of the clamp of the present invention shown clamping a tubular element to a mounting bar;

Figure 2 is a section taken substantially along the line 2—2 of Figure 1; and

Figures 3, 4 and 5 are side elevations of a tubular member and bar as shown in Figure 1 with the bar shown in section and which illustrate the simple manner in which the clamp is applied to secure the tube to the bar.

Referring to the drawings, A indicates a tube, rod or like element designed to be rigidly secured to a mounting member such as the bar B and which is effected by the clamp C of the present invention. The bar B is designed to be secured to suitable vertical structural elements of the building or the like in any suitable way such as by welding, bolting or the like and is disposed in spaced relation to a wall where the mounting may be adjacent to a wall.

The clamp C of the present invention is formed from a single piece of material and preferably from a continuous length of wire having resilient characteristics which is bent upon itself as at 10 to form a U-shaped structure, the arms of which are formed with two spaced apart, substantially right angular bends 11 and 12 finally terminating in arms 13 having free ends 14, while the bends 11 form the substantially parallel, spaced apart arms 15 and these arms are integrally joined by the intervening bent portion 10 of the wire.

The free ends 14 of the arms 13 are preferably looped to receive a tension applying securing member which, in a preferred form, takes the form of a screw stud 18 and preferably the looped portion 17 of one arm is looped in the manner of a coil to cooperate with the thread of the threaded stud in securing the arms 13 together under tension to effect the final clamping action. However, it is obvious that a bolt and nut might be employed or some other securing member used.

The bends 11 and 12 form in effect, a pair of spaced apart, substantially parallel, U-shaped members having the arms 13 and 15, the former terminating in free ends and the latter being integrally connected and provide between them a channel for receiving the mounting bar or member B. The bend 10 forms a U-shaped member that provides a channel or passage 19 between the arms 15 and a channel or passage 20 between the arms 13 which jointly receive and are capable of embracing a tubular member, rod or like element for securement to the mounting bar B. Preferably the arms 13 are inwardly inclined towards one another and by reason of their resilient characteristic will engage the tube or rod element in pressure engagement as to hold the clamp readily in position when it is mounted so that the tension applying securing means may be easily secured. The clamp may therefore be applied in a very simple manner as will be evident in the following illustration.

Assuming electric conduit is being mounted throughout the extent of an elevator shaft in a building and the transverse mounting bars have been placed in position at spaced apart intervals throughout the extent of the shaft the tubing A is disposed against a bar B and it is only necessary then to cause the U-shaped channel 19 to straddle the tube above the bar B as shown in Figure 3, swing the body of the clamp so that the free ends 13 are disposed rearwardly of the bar B, when the clamp may be lowered to engage the arms 15 with the top of the bar, while the clamp is rotated to cause the arms 13 to swing under the lower edge of the bar as shown in Figure 4 until it is placed in the position shown in Figure 5. It will be immediately maintained in this position by reason of the spring pressure of the inwardly inclined arms 13, whereupon it is only necessary to pass the screw 18 through the loop of one arm 13 and rotate it in threaded engagement with the coiled loop 17 of the opposite arm as to pull the arms toward each other firmly under tension and thus rigidly clamp the tube A to the mounting member B. This clamping effect is achieved by the bent portion 10 encircling the tube at one edge of the bar B and the arms 13 and screw 18 adjacent the other edge of the bar. The screw when tightened will pull the arms 13 towards each other and will tend to move the screw into engagement with the surface of the tube in a similar manner to the engagement of it by the bent portion 10 of the clamp body.

It is apparent that the clamp of the present invention is of simple character, economic to produce and it is obvious that it may be very quickly applied and will function to achieve very rigid securement of the element to the mounting bar.

What I claim as my invention is:

A clamp for securing rod, tube and like elements to a mounting member comprising a body formed from a continuous strip of wire having resilient characteristics, bent to provide a pair of spaced, substantially parallel, U-shaped members each having a first arm and a second arm, said second arms being inclined towards each other from their point of bending and terminating in free ends, the first arms of each of said members being integrally joined, the free ends of said second arms of each of said members being looped for detachably receiving a screw-threaded connecting member adapted to connect said arms under tension, said body thereby forming a pair of channels at right angles to one another, one for receiving said element and the other for receiving said mounting member and securing them to one another when said free ends of said second arms are secured under tension, said inclined second arms functioning to grip said element when the clamp is positioned and hold the clamp in place for attachment of said connecting member.

References Cited in the file of this patent

UNITED STATES PATENTS

| | | |
|---|---|---|
| 495,029 | Depew | Apr. 11, 1893 |
| 1,317,326 | Sherman | Sept. 30, 1919 |
| 2,230,373 | Briggs et al. | Feb. 4, 1941 |

FOREIGN PATENTS

| | | |
|---|---|---|
| 417,464 | Italy | Jan. 20, 1947 |